United States Patent
Vasil'yev et al.

(10) Patent No.: US 10,290,382 B2
(45) Date of Patent: May 14, 2019

(54) METHOD FOR PREPARING TO RELOAD A NUCLEAR REACTOR

(71) Applicant: JOINT STOCK COMPANY "AKME-ENGINEERING", Moscow (RU)

(72) Inventors: Nikolay Dmitrievich Vasil'yev, Saint Petersburg (RU); Vladimir Evgen'yevich Ogurtsov, Saint Petersburg (RU); Alexandr Ivanovich Kuznetsov, Saint Petersburg (RU)

(73) Assignee: Joint Stock Company "AKME-ENGINEERING", Moscow (RU)

( * ) Notice: Subject to any disclaimer, the term of this patent is extended or adjusted under 35 U.S.C. 154(b) by 136 days.

(21) Appl. No.: 15/305,075

(22) PCT Filed: Apr. 17, 2015

(86) PCT No.: PCT/RU2015/000250
§ 371 (c)(1),
(2) Date: Mar. 27, 2017

(87) PCT Pub. No.: WO2015/160285
PCT Pub. Date: Oct. 22, 2015

(65) Prior Publication Data
US 2018/0033504 A1    Feb. 1, 2018

(30) Foreign Application Priority Data

Apr. 18, 2014   (RU) ................................. 2014115600

(51) Int. Cl.
| | | |
|---|---|---|
| *G21C 19/105* | (2006.01) | |
| *G21C 19/10* | (2006.01) | |
| *G21C 19/19* | (2006.01) | |
| *G21C 19/20* | (2006.01) | |
| *G21C 1/02* | (2006.01) | |
| *G21C 15/247* | (2006.01) | |

(52) U.S. Cl.
CPC ........... *G21C 19/105* (2013.01); *G21C 19/10* (2013.01); *G21C 19/19* (2013.01); *G21C 19/205* (2013.01); *G21C 1/02* (2013.01); *G21C 15/247* (2013.01)

(58) Field of Classification Search
CPC ...... G21C 19/10; G21C 19/105; G21C 19/19; G21C 19/205
USPC ................................. 376/260, 261, 263, 271
See application file for complete search history.

(56) References Cited

FOREIGN PATENT DOCUMENTS

| | | | |
|---|---|---|---|
| JP | 1116495 A | 5/1989 | |
| JP | 1313796 A | 12/1989 | |

(Continued)

*Primary Examiner* — Jack W Keith
*Assistant Examiner* — Daniel Wasil
(74) *Attorney, Agent, or Firm* — Craft Chu PLLC; Andrew W. Chu (57) ABSTRACT

A method for preparing to reload a fast nuclear reactor with heavy liquid metal coolant includes extracting a reactor plug and extracting a removable reactor block. The method includes installing handling equipment to form an unloading path under radiation safety conditions. The reactor plug is extracted from the reactor monoblock housing and transported to a plug shaft. The removable reactor block is extracted from the reactor monoblock housing and transported to a block shaft for later disassembly.

11 Claims, 3 Drawing Sheets

(56) References Cited

FOREIGN PATENT DOCUMENTS

| JP | H04353798 | * 12/1992 | ............. G21C 19/19 |
|----|-----------|-----------|--------------------------|
| RU | 2008144275 | 5/2010 | |

* cited by examiner

METHOD FOR PREPARING TO RELOAD A NUCLEAR REACTOR

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The invention relates to nuclear engineering, in particular to the method of the maintaining a fast nuclear reactor with heavy liquid metal coolant. More particularly, the method relates to preparing to reload the fast nuclear reactor. Even more particularly, the method relates to extracting the plug and the removable reactor block from the reactor.

2. Description of Related Art Including Information Disclosed Under 37 CFR 1.97 and 37 CFR 1.98

Maintaining operation of a fast nuclear reactor can include reloading reactor core elements with heavy liquid metal coolant. The reactor monoblock must be removed, while accounting for the nuclear and radiation safety conditions. The plug or cover of the reactor monoblock is extracted (with a purpose of its subsequent use as intended) into a first shaft designated for the reactor plug. The removable reactor block of the reactor monoblock is also extracted (after the spent fuel assemblies were unloaded) into a second shaft designated for the removable reactor block, which can be further dismantled for disposal. The process of extracting the reactor plug and extracting the removable reactor block (without spent fuel assemblies (SFA) of the reactor monoblock) is characterized by the fact that the process takes place under the influence of considerable buoyancy of the heavy liquid metal coolant due to its high density exceeding that of the material (steel) used in the extraction equipment and devices. It is necessary to consider the effects of high temperatures of the heavy liquid metal coolant and a high degree of radioactive contamination of the equipment used in the process of extracting the reactor plug and extracting the removable reactor block.

A method of plug removal (extraction) is known, which is specified in the description to patent RU 2166808, C1 G21C19/105, published on May 10, 2001. This method involves plug removal from the coolant flowmeter in the nuclear reactor fuel channels by a plug removing mechanism.

A container for unloading the removable block with or without a core is known (patent RU 2399972, C2 G21C19/10, G21F5/08, F16K7/18, published on 20.00.2010). The method of the removable reactor block unloading, as described in the specification for the known container, involves extracting of the removable block into a container using a pulling hoist with an automatic grip.

The disadvantage of this method is impossibility of controlling fixation devices for the removable block.

The prototype of the invention may be a known method of fast nuclear reactor reloading, and a reloading system (patent RU 2224307, C2 G21C19/00, G21C19/10, published on Feb. 20, 2004), which consists of carrying out spent fuel assemblies reloading operations using a direct removal refueling machine.

However, this method is incompatible with extracting the plug or extracting the removable block.

Consider the fact that low power reactor plants, such as a LBFR (lead-bismuth fast reactor), with fast reactors cooled by liquid metal lead-bismuth coolant using a modular principle of the power unit construction, are the pilot ones in the implementation of large-scale high-tech projects in the nuclear industry. The analogues of preparing to reload or refuel by extracting the reactor plug and extracting the removable reactor block for fast nuclear type reactors, do not have the same purpose, technical essence and achieved result of the prior art.

BRIEF SUMMARY OF THE INVENTION

The basis of the invention is the objective to perform all process operations without degradation of the radiation situation as to the reactor plug and removable reactor block extractions.

To solve this problem a method has been provided to prepare a nuclear reactor for reloading by extracting the reactor plug of the reactor monoblock housing and extracting the removable reactor block of the reactor monoblock housing without spent fuel assemblies (SFAs) using a handling equipment set. The method includes installation of handling equipment when preparing for the reactor plug and the removable reactor block for extraction, extraction of the reactor plug from the reactor monoblock housing, transportation and placement of the reactor plug in a plug shaft, extraction of the removable reactor block without spent fuel assemblies from the reactor monoblock housing, and transportation and placement of the removable block in the removable block shaft for later dismantling.

Technical results of the inventive method are as follows, in particular:
  control capabilities for devices fixing the reactor plug and the reactor removable block;
  ensuring the safety of operations by creating an unloading path with the handling equipment, as well as removing a gas-air mixture from internal cavities of the handling equipment and into a special ventilation so as to form a controlled gas environment with the internal cavities filled with inert gas;
  reducing the amount of equipment needed for the extractions and transportations, and reducing the time of auxiliary operations on installation of handling equipment, alignment of handling equipment, and removal of the reactor plug and the removable reactor block from each position in the unloading path by using the handling equipment comprised of a cable reduction box, a guide channel and a reloading armor;

elimination of the possibility of contacts between the reactor monoblock (RMB) and lead-bismuth coolant with atmospheric air;

ensuring the possibility of the inner cavities of the handling equipment filling with inert gas;

restraining the reactor plug from surfacing and breaking away, when the additional cargo or ballast is removed in the unloading path;

ensuring the reactor plug movement without distortions;

ensuring operational safety for the operating personnel when dismantling the removable reactor block in the block shaft;

excluding the possibility of the reactor plug turning around its axis;

providing vertical positioning of the reactor plug during transportation and process operations (plug balancing);

maintaining the reactor plug orientation during discharge relative to the reactor axis;

maintaining the removable reactor block orientation during discharge relative to the reactor axis.

The following features of the claimed invention have an influence on the abovementioned technical results.

Installation of handling equipment during preparation for extracting and unloading is carried out as follows: a plug transportation device is installed and fixed on the reactor plug; and an additional load or ballast is installed and secured onto the plug transportation device. The pressure flange between the reactor monoblock and the reactor monoblock housing is disassembled; and the inner frame part of the cable reduction box is installed onto the reactor plug or cover of the reactor monoblock (RMB) and secured. The middle part of the plug transportation device is turned into a position where its projections will enter the operating area of the fixing element of the inner part of the cable reduction box; and the additional cargo is removed. The outer part of the cable reduction box is installed onto the RMB, and the inner cavity of the cable reduction box is checked for tightness with overpressure. The gas-air mixture is removed from the inner cavity of the cable reduction box into ventilation under gaseous medium monitoring; and the inner cavity of the cable reduction box is filled with inert gas.

The reactor plug is removed from the RMB housing as follows: a guide channel is installed onto the cable reduction box, and, at the same time, the tightness between the guide channel and the cable reduction box is provided using a sealing element. On the upper support surface of the guide channel fixed on the ceiling of the reactor well, a reloading armor is installed; and tightness of the inner cavity of the reloading armor and the inner cavity of the guide channel cavities are checked with overpressure. The gas-air mixture is removed from the inner cavity of the reloading armor and the inner cavity of the guide channel into the ventilation under the gaseous medium monitoring, and then, the inner cavity of the reloading armor and the inner cavity of the guide channel are filled with inert gas. The plug transportation device and the reactor plug move into an upper position using a movement drive of the cable reduction box to release the fixing element holding the plug transportation device and the reactor plug to the cable reduction box. An automatic grip of the reloading armor is lowered until interlocked with the plug transportation device, and the automatic grip of the reloading armor raises the plug transportation device and the reactor plug into the highest position in the reloading armor. The damper of reloading armor and the damper of the cable reduction box are closed and sealed.

The reloading armor with the reactor plug is further transported to the plug shaft, and the reactor plug is unloaded using a cargo crane and a lifting beam. The reloading armor is transported to storage, and the guide channel is dismantled.

The removable reactor block (without SFA) is removed from the RMB housing as follows: the guide channel is re-installed onto the cable reduction box, wherein the upper support surface of the guide channel is fixed on the ceiling of the reactor well. The reloading armor is installed together with a removable block transportation device. The tightness of the inner cavity of the reloading armor and the inner cavity of the guide channel is checked with overpressure. The gas-air mixture is removed from the inner cavity of the reloading armor and the inner cavity of the guide channel into the ventilation under gaseous medium monitoring. The inner cavity of the reloading armor and the inner cavity of the guide channel are filled with inert gas. The reloading armor automatic grip is lowered until interlocked with the removable reactor block. The reloading armor automatic grip with the removable reactor block is moved into its highest position in the reloading armor; and then the damper of the cable reduction box and the damper of the reloading armor are closed and sealed.

Then, the reloading armor loaded with the removable reactor block (without SFA) is transported to the block shaft for the removable reactor block. The removable reactor block is unloaded into the block shaft for dismantling, and the reloading armor is transported to storage.

BRIEF DESCRIPTION OF THE SEVERAL VIEWS OF THE DRAWINGS

The invention is illustrated at the following drawings provided.

DETAILED DESCRIPTION OF THE INVENTION

To prepare the nuclear reactor 900 for reloading or refueling, it is necessary to remove the reactor plug 8 and the removable reactor block 10. According to FIGS. 1-3C, the nuclear reactor 900 includes a top 901 with other control components 902, such as electric drives, a main circulation pump (MCP), and control and protection systems (CPS). The nuclear reactor 900 also includes a reactor well 904 with a ceiling 905, a reactor monoblock housing 7, a reactor monoblock 701, a core 908, and a pressure flange 907 removably engaged between the reactor monoblock 701 and the reactor monoblock housing 7. A set of handling equipment is used, including a cable reduction box 1, an additional cargo or ballast 2, a guide channel 3, a reloading armor 4, a plug transportation device 5, and a removable block transportation device. Other equipment includes a set of lifting beams and an automated system for machinery management of all equipment.

The cable reduction box 1 is intended for installation of other handling equipment and is coupled with the reactor monoblock housing (RMB housing) 7. The cable reduction box 1 includes radiation protection for operating personnel. FIGS. 1-3C show the cable reduction box 1 being comprised of an inner frame part 101 with locking elements 105, stops 107 corresponding to the locking elements 105, an external part 109, and movement drive 106 for the locking elements 105. The inner frame part 101 defines an operating area 102. The cable reduction box 1 has an inner cavity 104 and a damper 103 or gate at the reactor monoblock housing 7.

The additional cargo 2 or ballast prevents the reactor plug 8 from surfacing or breaking away, when the pressure flange 907 of the nuclear reactor 900 is removed. The pressure flange 907 keeps the reactor plug 8 in the reactor monoblock housing 7 when the nuclear reactor 900 is in operation.

The guide channel 3 is comprised of a tube 301 with a supporting flange 302 having flanges 307 for connection to a special ventilation stationary system (not shown). The guide channel 3 creates an unloading path 906 for the reactor plug 8 and the removable reactor block 10. The guide channel 3 also includes control devices to direct and position the automatic grip 9 of the reloading armor 4, as the automatic grip 9 moves outside of the vertical cylindrical vessel 401 of the reloading armor. The guide channel 3 has an inner cavity 304 and a damper 303 or gate at the reloading armor 4, and a stop member 308 at the cable reduction box 1. There can be a sealing element 305 between the cable reduction box 1 and the guide channel 3. The guide channel 3 has an upper support surface or upper bearing surface 306 in removable engagement with the reloading armor 4.

The reloading armor 4 is a vertical cylindrical vessel 401 having heat insulation and biological protection made of lead (opposite to the core). The reloading armor 4 is comprised of a pulling hoist 402 with an automatic grip 9, providing for automatic engagement and disengagement with a head of the plug transportation device 5 and a head of the removable block transportation device 6. The reloading armor 4 has an inner cavity 404 and a damper 403 or gate at the guide channel 3.

To move the reactor, plug 8, the plug transportation device 5 is used. To move the removable reactor block 10, the removable block transportation device 6 is used.

The plug transportation device (PTD) 5 removably engages the automatic grip 9 of the reloading armor 4 and moves the reactor plug 8 along the unloading path 906 into the reloading armor 4. The additional cargo 2 or ballast is loaded onto the plug transportation device 5, when the reactor plug 8 is prepared to be moved. The additional cargo 2 on the plug transportation device 5 prevents the reactor plug 8 from breakaway before ready.

The removable block transportation device (RBTD) 6 removably engages the automatic grip 9 of the reloading armor 4 and moves the removable reactor block 10 along the unloading path 906 to the removable armor 4. The removable block transportation device 6 controls fastening or unfastening of the removable reactor block 10 in a block shaft and controls pressing down or raising of the removable reactor block 10 to overcome buoyancy along the unloading path 906.

A set of lifting beams (not shown) provides for the transportation of the set of handling equipment, for example, lifting beams on an electric bridge crane.

An automated control system (ACS) (not shown) for the set of handling equipment and other equipment provides for the collection, processing, monitoring, reporting of information on the situation and status of the components. The ACS operates the various electric motor drives of the set of the handling equipment and registers information on the process of overall reactor plant unloading. The ACS performs its function when the reactor plug 8 is lifted and when the removable reactor block 10 is removed.

The proposed method is carried out in the following sequence.

The initial state of the nuclear reactor 900 preparing to reload is that nuclear reactor 900 is stopped and that the protection of top 901 of the nuclear reactor 900 is dismantled. The other control components 902, such as electric drives of the main circulation pump (MCP) and drives of the control and protection systems (CPS) are also dismantled. The reactor 900 also includes a reactor well 904, a reactor monoblock housing 7 in the reactor well 904, a reactor monoblock 701 mounted in the reactor monoblock housing 7, and pressure flange 907 removable engaged with the reactor monoblock housing 7 and reactor monoblock 701. The reactor monoblock includes a reactor plug 8, a plurality of fuel assemblies 801, a plurality of spent fuel assemblies 802, and a removable reactor block 10 that holds the fuel assemblies 801 and spent fuel assembles 802, after being spent, in an operating configuration.

Figure 1:
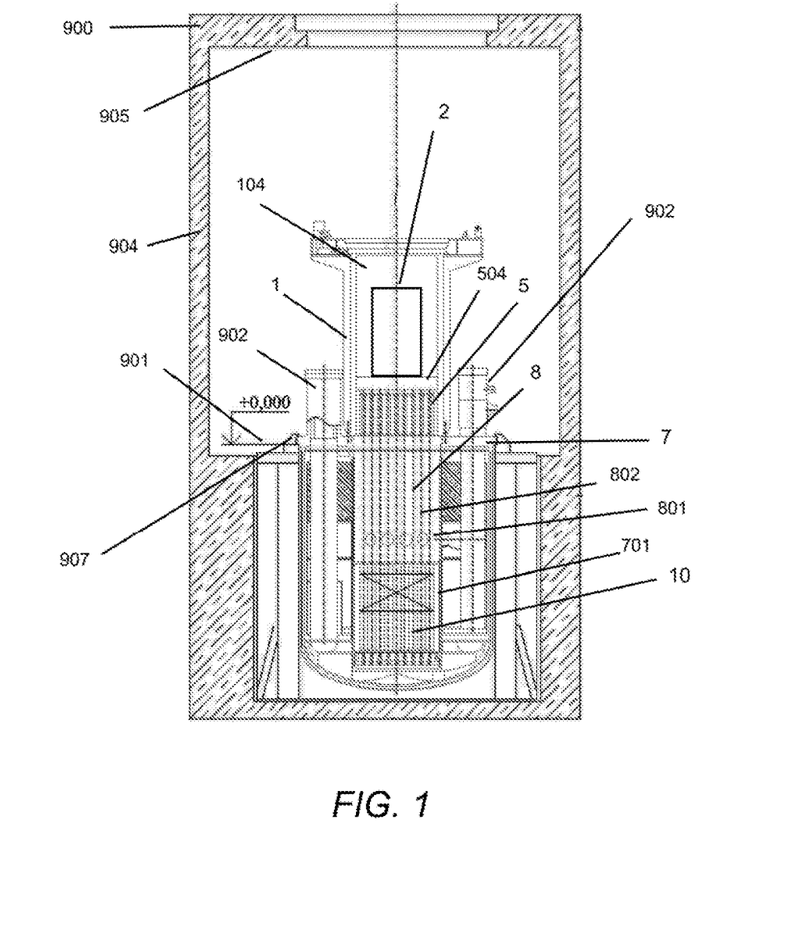
FIG. 1 is a sectional view of the reactor before extracting the reactor plug and extracting the removable reactor block.

Preparatory steps are performed on the nuclear reactor 900 in a stopped condition, as shown in FIG. 1.

Using a cargo crane and a lifting beam, the plug transportation device 5 is installed onto the reactor plug 8 and secured with screws from the service platform. Additional cargo 2 or ballast is mounted onto the upper end of the plug transportation device using a cargo crane and a lifting beam. The pressure flange indicated by 907 is detached and disassembled using a device designed for unscrewing (screwing) of pressing flange nuts. Using a cargo crane and a lifting beam, the inner frame part 101 of the cable reduction box 1 is installed and fixed onto the reactor monoblock housing 7 with fastening screws 108. The middle part 502 of the plug transportation device 108 5 can be a supporting ring. Using a special tool, such as a wrench, the middle part 502 is turned into a position where projections indicated by 503 enter the operating area 102 of the locking elements 105 of the cable reduction box 1, located on the lead screws of the cable reduction box 1. With the use of a cargo crane and a lifting beam, additional cargo 2 is now removed, after at least the inner frame part 101 of the cable reduction box 1 is installed. Using a cargo crane and a lifting beam, the external part 109 of the cable reduction box 1 is mounted with a closed and sealed damper 103 on the reactor monoblock housing 7. The internal cavity 104 of the cable reduction box 1 is checked for leaks with overpressure. The internal medium or atmosphere of the cable reduction box cavity 1 is replaced with inert gas instead of air.

Figures 2A, 2B, 2C:
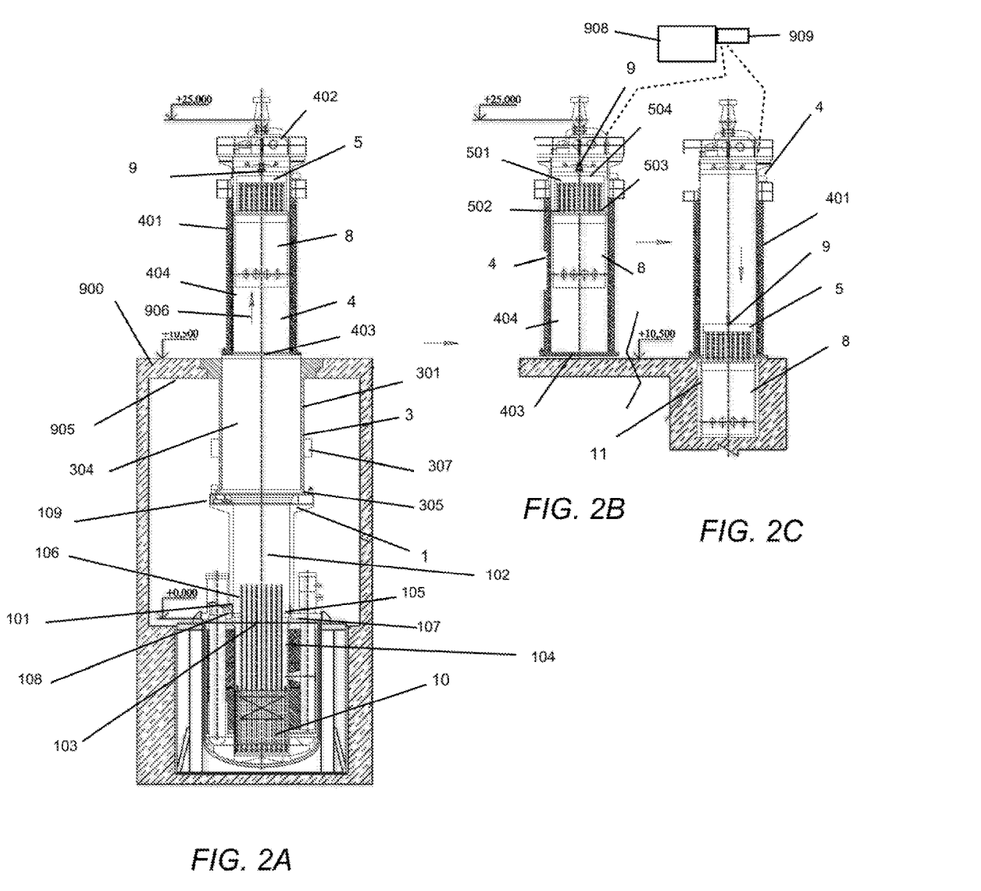
FIG. 2A is a sectional view of the handling equipment installed in the reactor with the reactor plug in the reactor monoblock housing.
FIG. 2B is a sectional view of the reactor plug in the highest position in transport between the reactor monoblock housing and the plug shaft.
FIG. 2C is a sectional view of the reactor plug in the plug shaft.

FIGS. 2A, 2B, and 2C illustration the extraction of the reactor plug 8 from the reactor monoblock housing 7.

Using a cargo crane and a lifting beam, the guide channel 3 is installed on the cable reduction box 1, wherein the upper bearing surface 306 of the guide channel 3 is fixed on the ceiling 905 of the reactor well 904. The tightness between the guide channel 3 and the cable reduction box 1 is provided using a sealing element indicated by 305. The reloading armor 4 is installed on the upper bearing surface 306 of the guide channel 3 using a cargo crane. A transition piece (not shown) is fixed onto the automatic grip 9 of the reloading armor 4 in advance for docking with plug transportation device 5.

The damper 403 of the reloading armor 4 is decompressed and opened. The inner cavity 404 of the reloading armor 4 and inner cavity 304 of the guide channel 3 are checked for leaks with overpressure. The internal medium of the inner cavity 404 of the reloading armor 4 and the inner cavity 304 of the guide channel 3 are replaced with inert gas instead of air. The damper 103 or gate of the cable reduction box 1 is decompressed and opened.

The movement drive 106 of the locking element 105 of the cable reduction box 1 is turned on and the plug transportation device 5 is moved together with the reactor plug 8 to an upper position in the cable reduction box 1, where upper limiting elements of the locking element 105 of the cable reduction box 1 are automatically removed from the projections 503 of the middle part 502 or supporting ring, and the buoyancy acting on the reactor plug 8 is equal to zero.

The automatic grip 9 of the reloading armor 4 is lowered into a lowest position until stopped against the stop member 308 of the guide channel 3. Any control drives located on a moving line of the guide channel 3 are connected to the automatic grip 9, and the automatic grip 9 is interlocked with the plug transportation device 5. Control drives of the automatic grip 9 and a clutch are disconnected, and the automatic grip 9 coupled with the plug transportation device 5 is lifted by 100÷200 mm upwards. At the same time, the stops 107 of the locking element 105 of the cable reduction box 1 are removed from the middle part 502 or supporting ring of the plug transportation device 5.

The automatic grip 9 of the reloading armor 4 with the reactor plug 8 is moved into the highest position in the reloading armor. The damper 103 of the cable reduction box 1 and the damper 403 reloading armor 4 are closed and sealed. The reloading armor 4 with the reactor plug 8 are transported to a plug shaft 11 using a cargo crane 908 and a lifting beam 909, and the reactor plug 8 is unloaded into the plug shaft 11 by decompressing the inner cavity 404 of the reloading armor 4 and opening the damper 403 of the reloading armor 4, in order to lower the automatic grip 9 to a lower position in the plug shaft 11.

Inside the plug shaft 11, similar control drives for managing the automatic grip 9 removal are arranged as well as the drives for disengaging the plug transportation device 5. The automatic grip 9 with a transition element can be lifted back to the highest position in the reloading armor 4; and the damper 403 of the reloading armor 4 is closed and sealed. The reloading armor 4 is transported to storage. The guide channel 3 is dismantled.

Figure 3A:
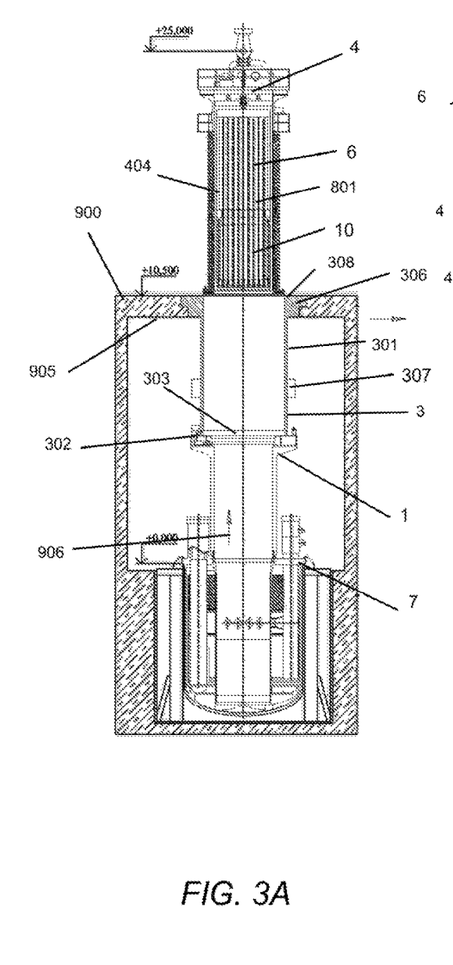
FIG. 3A is a sectional view of the handling equipment installed in the reactor with the removable reactor block in the reactor monoblock housing.
Figures 3B, 3C:
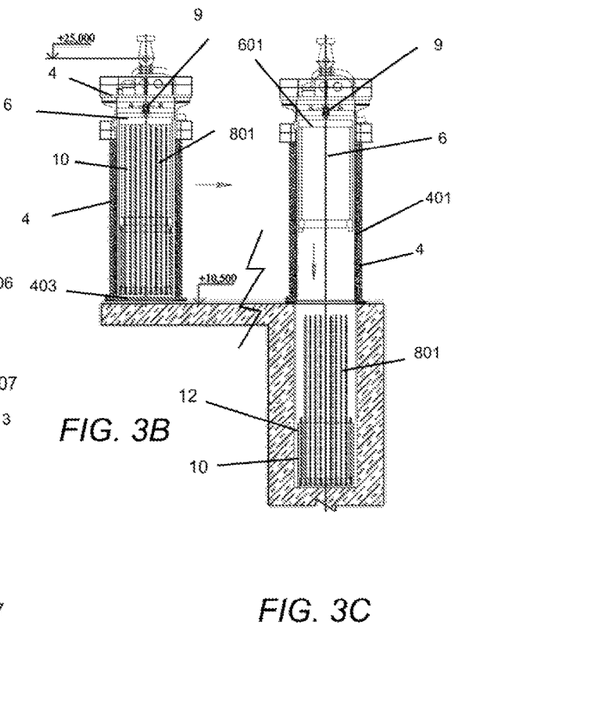
FIG. 3B is a sectional view of the removable reactor block in the highest position in transport between the reactor monoblock housing and the block shaft.
FIG. 3C is a sectional view of the removable reactor block in the block shaft.

With the reactor plug 8 in the plug shaft 11 and the guide channel 3 dismantled from the cable reduction box 1, the spent fuel assemblies (SFA) 802 are removed from the reactor monoblock 701. In particular, the SFA 802 are removed from the removable reactor block 10. In the stopped configuration, the fuel assemblies 801 may all have become spent fuel assemblies 802. The nuclear reactor 900 requires reloading. The reactor monoblock 701 is now left with the removable reactor block 10 in the reactor monoblock housing 7. FIGS. 3A, 3B, and 3C show the extraction of the removable reactor block 10 or removable unit without SFA.

In the state after the reactor plug 8 is removed and the SFA are unloaded from the removable reactor block 10, the damper 103 of the cable reduction box 1 damper is closed and sealed The guide channel 3 is re-installed on the cable reduction box 1 using a cargo crane and a lifting beam, and the upper bearing surface 306 of the guide channel 3 is fixed on the ceiling 905 of the reactor well 904 again. The tightness between the guide channel 3 and the cable reduction box 1 can be ensured by the sealing element 305. The reloading armor 4 is installed back on the upper bearing surface 306 of the guide channel 3 using a cargo crane.

The removable block transportation device 6 is preliminarily fixed onto the automatic grip 9 of the reloading armor 4. The damper 403 of the reloading armor 4 is decompressed and opened. The inner cavity 404 of the reloading armor 4 and inner cavity 304 of the guide channel 3 is checked for leaks with overpressure. The internal medium of the inner cavity 104 of the cable reduction box 1 and the inner cavity 404 of the reloading armor 4 is replaced with inert gas. The damper 103 or gate of the cable reduction box 1 is decompressed and opened.

The automatic grip 9 of the reloading armor 4 is moved into the lowest position until stopped against the stop member 308 of the guide channel 3 again. Any control drives located on the moving line of the channel guide 3 are connected to the automatic grip 9, and the automatic grip 9 is interlocked with the removable reactor block 10. Using a drive located on the moving line of the guide channel 3, interlocks of the removable reactor block 10 are opened by turning appropriate rotating pins.

The control drive of the automatic grip 9 is separate from the removable block transportation device 6, and the automatic grip 9 of the reloading armor 4 with the removable block 10 and removable block transportation device 6 are moved into the highest position in the reloading armor 4. The damper 103 of the cable reduction box 1 and the damper 403 of the reloading armor 4 are closed and sealed. The reloading armor 4 is transported together with the removable reactor block 10 to a block shaft 12, and the removable reactor block 10 is unloaded into the block shaft 12 by decompressing the reloading armor 4 and opening the damper 403 of the reloading armor 4 in order to lower the automatic grip to the lower position.

With the removable reactor block 10 unloaded in the block shaft 12, the automatic grip 9 with the removable block transportation device 6 is moved up into the highest position in the reloading armor 4, and the damper 403 of the reloading armor is closed and sealed. The reloading armor 4 is transported to storage. The removable reactor block 10 does not have tight-fitting seats, unlike the reactor plug 8, so when rotary locks are turned around, buoyancy and extra effort by pulling hoist 9 of the reloading armor 4 is enough to extract the removable reactor block 10 from the reactor monoblock housing 7.

Above the plug shaft 11 and the block shaft 12, there can be grip disengaging control drives as well as drives for disengaging of the plug transportation device 5 and the removable block transportation device 6.

After full completion of extracting or unloading operations, the inner surface and the seats of the reactor monoblock housing 7 are inspected.

The claimed inventive method allows to carry out all process operations related to the reactor plug 8 and removable reactor block 10 without SFA extractions by a set of handling equipment and transportation devices providing a reliable biological protection for personnel and equipment.

We claim:

1. A method for preparing to reload a nuclear reactor with liquid metal coolant, said method comprising the steps of:
   assembling a reactor having a top with control components and being comprised of
      a reactor well,
      a reactor monoblock housing in said reactor well,
      a reactor monoblock mounted in said reactor monoblock housing, and
      a pressure flange removably engaged with said reactor monoblock housing and said reactor monoblock,
      wherein said reactor monoblock is comprised of
         a reactor plug,
         a plurality of fuel assemblies,
         a plurality of spent fuel assemblies, and
         a removable reactor block in an operating configuration,
            said pressure flange setting said reactor plug in said reactor monoblock housing in said operating configuration;
   installing a plug transportation device on said reactor plug,
      wherein said plug transportation device is comprised of
         a head,
         a middle part with projections and
         an upper end;
   installing an additional cargo on said upper end of said plug transportation device;
   installing and fixing a cable reduction box on said reactor monoblock housing,
      wherein said cable reduction box is comprised of
         an inner frame part,
         an inner cavity,
         an external part, and
         a damper between said inner cavity of said cable reduction box and said reactor monoblock housing,
            said inner frame part being comprised of
               locking elements,
               a movement drive for said locking elements, and
               stops corresponding to said locking elements,
               said locking elements forming an operating area in said cable reduction box;
   turning said middle part of said plug transportation device into a position corresponding to said projections being set in said operating area;
   removing said additional cargo from said upper end of said plug transportation device;
   installing said external part of said cable reduction box on said reactor monoblock;
   replacing internal media of said inner cavity of said cable reduction box;
   installing a guide channel on said cable reduction box,
      wherein said guide channel is comprised of
         a tube with a supporting flange,
         a plurality of flanges for connection to ventilation, and
         an upper bearing surface,
         said guide channel having an inner cavity and a damper between said inner cavity of said guide channel and said cable reduction box;
   installing a reloading armor on said guide channel,
      wherein said reloading armor is comprised of
         a vertical cylindrical vessel,
         a pulling hoist, and
         an automatic grip at an end of said pulling hoist,
         said reloading armor having an inner cavity and a damper between said inner cavity of said reloading armor and said guide channel;
   replacing internal media of said inner cavity of said reloading armor and said inner cavity of said guide channel;
   moving said plug transportation device with said reactor plug into said reloading armor;
   transporting said reloading armor with said reactor plug into a plug shaft;
   unloading said reactor plug from said reloading armor within said plug shaft;
   removing said guide channel from said cable reduction box;
   re-installing said guide channel on said cable reduction box;
   installing a removable block transportation device on said reloading armor,
      wherein said removable block transportation device is comprised of a head,
         said head of said removable block transportation device being coupled to said automatic grip of said reloading armor, during the step of installing said removable block transportation device on said reloading armor;
   replacing internal media of
      said inner cavity of said cable reduction box,
      said inner cavity of said guide channel, and
      said inner cavity of said reloading armor;
   lowering said automatic grip so as to install said removable block transportation device on said removable reactor block;
   moving said removable block transportation device with said removable reactor block into said reloading armor;
   transporting said reloading armor with said removable reactor block to a block shaft; and
   unloading said removable reactor block from said reloading armor within said block shaft.

2. The method for preparing to reload a nuclear reactor, according to claim 1, further comprising the step of:
   dismantling said pressure flange from said reactor monoblock housing in a stopped configuration, after the steps of installing said plug transportation device on said reactor plug and the step of installing said additional cargo on said upper end of said plug transportation device.

3. The method for preparing to reload a nuclear reactor, according to claim 1, further comprising the step of:
   sealing between said guide channel and said cable reduction box with a sealing member.

4. The method or preparing to reload a nuclear reactor, according to claim 1,
   wherein the step of replacing internal media of said inner cavity of said cable reduction box is comprised of:
      checking tightness of said inner cavity of said cable reduction box with overpressure;
      removing a gas-air mixture from said inner cavity of said cable reduction box into a ventilation with gas medium-control; and
      filling said inner cavity of said cable reduction box with inert gas.

5. The method for preparing to reload a nuclear reactor, according to claim 1, wherein the step of installing said reloading armor on said guide channel is comprised of:
fixing said upper support surface of said guide channel on a ceiling of said reactor well.

6. The method for preparing to reload a nuclear reactor, according to claim 1,
wherein the step of replacing internal media of said inner cavity of said reloading armor and said inner cavity of said guide channel is comprised of:
checking tightness of said inner cavity of said reloading armor and said inner cavity of said guide channel with overpressure;
removing a gas-air mixture from said inner cavity of said reloading armor and said inner cavity of said guide channel into a ventilation with gas medium control; and
filling said inner cavity of said reloading armor and said inner cavity of said guide channel with inert gas.

7. The method for preparing to reload a nuclear reactor, according to claim 1,
wherein the step of moving said plug transportation device with said reactor plug into said reloading armor comprises the steps of:
moving said locking elements of said cable reduction box with said movement drive to said stops corresponding to said locking elements so as to move said plug transportation device and said reactor plug to an upper position in said cable reduction box;
lowering said automatic grip of said reloading armor to said plug transportation device;
coupling of said automatic grip of said reloading armor with said plug transportation device;
moving said automatic grip of said reloading armor with said reactor plug into a highest position in said reloading armor;
sealing and closing said damper of said reloading armor; and
sealing and closing said damper of said cable reduction box.

8. The method or preparing to reload a nuclear reactor, according to claim 7,
wherein said guide channel further comprises a stop member at said damper of said guide channel, and
wherein the step of lowering said automatic grip of said reloading armor to said plug transportation device further comprises the step of:
stopping said automatic grip of said reloading armor against said stop member of said guide channel.

9. The method for preparing to reload a nuclear reactor, according to claim 1,
wherein the step of transporting said reloading armor with a said reactor plug to said shaft is carried out by a cargo crane and a lifting beam, and
wherein the step of unloading said reactor plug from said reloading armor within said plug shaft is carried out by said cargo crane and said lifting beam.

10. The method for preparing to reload a nuclear reactor, according to claim 1, further comprising the steps of:
transporting said reloading armor to storage, after the step of unloading said reactor plug from said reloading armor within said plug shaft.

11. The method for preparing to reload a nuclear reactor, according to claim 1, further comprising the steps of:
sealing and closing said damper of said cable reduction box, after the step of moving said removable block transportation device with said removable block into said reloading armor; and
sealing and closing said damper of said reloading armor, after the step of moving said removable block transportation device with said removable block into said reloading armor.

* * * * *